US010713486B2

(12) United States Patent
Murase et al.

(10) Patent No.: US 10,713,486 B2
(45) Date of Patent: Jul. 14, 2020

(54) FAILURE DIAGNOSIS SUPPORT SYSTEM AND FAILURE DIAGNOSIS SUPPORT METHOD OF ROBOT

(71) Applicant: TOYOTA JIDOSHA KABUSHIKI KAISHA, Toyota-shi, Aichi-ken (JP)

(72) Inventors: Kazuto Murase, Toyota (JP); Yuka Hashiguchi, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 143 days.

(21) Appl. No.: 15/904,605

(22) Filed: Feb. 26, 2018

(65) Prior Publication Data

US 2018/0268217 A1 Sep. 20, 2018

(30) Foreign Application Priority Data

Mar. 16, 2017 (JP) ................................ 2017-051116

(51) Int. Cl.
*G06K 9/00* (2006.01)
*B25J 19/00* (2006.01)
*B25J 9/16* (2006.01)
*H04N 5/225* (2006.01)
*B25J 19/02* (2006.01)

(52) U.S. Cl.
CPC ........ *G06K 9/00664* (2013.01); *B25J 9/1674* (2013.01); *B25J 19/0095* (2013.01); *B25J 19/021* (2013.01); *H04N 5/2253* (2013.01); *H04N 5/2257* (2013.01); *Y10S 901/47* (2013.01)

(58) Field of Classification Search
CPC ..... G06K 9/00664; B25J 9/1674; B25J 9/021; H04N 5/2253; Y10S 901/47
See application file for complete search history.

(56) References Cited

U.S. PATENT DOCUMENTS

| | | | | |
|---|---|---|---|---|
| 2002/0003415 | A1* | 1/2002 | Nakai | G05B 19/4065 318/569 |
| 2004/0186622 | A1* | 9/2004 | Aiuchi | H01L 21/67276 700/241 |
| 2009/0143913 | A1* | 6/2009 | Kim | B25J 9/1674 700/259 |
| 2015/0326784 | A1* | 11/2015 | Hayashi | H04N 5/23245 348/220.1 |
| 2017/0243339 | A1* | 8/2017 | Yamamoto | B25J 9/0084 |
| 2018/0088057 | A1* | 3/2018 | Hashikami | H04N 5/2252 |

FOREIGN PATENT DOCUMENTS

| | | |
|---|---|---|
| JP | 61-226289 A | 10/1986 |
| JP | 2007-152470 A | 6/2007 |
| JP | 2013-139067 A | 7/2013 |
| JP | 6088679 B1 | 3/2017 |

* cited by examiner

Primary Examiner — Sean T Motsinger
(74) Attorney, Agent, or Firm — Sughrue Mion, PLLC

(57) ABSTRACT

A failure diagnosis support system includes first image acquisition means mounted on a robot for acquiring an image of the robot; and control means for controlling position and orientation of the first image acquisition means. The control means controls the position and orientation of the first image acquisition means at a predetermined timing so that the first image acquisition means faces a predetermined part of the robot. The first image acquisition means acquires an image of the predetermined part at the position and orientation controlled by the control means.

4 Claims, 11 Drawing Sheets

FAILURE DIAGNOSIS SUPPORT SYSTEM AND FAILURE DIAGNOSIS SUPPORT METHOD OF ROBOT

CROSS REFERENCE TO RELATED APPLICATIONS

This application is based upon and claims the benefit of priority from Japanese patent application No. 2017-051116, filed on Mar. 16, 2017, the disclosure of which is incorporated herein in its entirety by reference.

BACKGROUND

The present disclosure relates to a failure diagnosis support system and a failure diagnosis support method of a robot that support failure diagnosis of a robot.

A failure diagnosis support apparatus that operates an arm of a robot and performs a failure diagnosis based on a change in an output signal of a sensor for detecting a distance between the arm and the robot is known (see, for example, Japanese Unexamined Patent Application Publication No. 2007-152470).

Although the above failure diagnosis support apparatus can determine as to whether or not the sensor or the like is faulty, it is difficult to determine a cause of a failure that occurs due to an external factor such as distortion or biting of a part or the like. In this case, when a person performing maintenance directly checks the robot, the cause of the failure can be easily determined. However, it requires a large human load to deploy a person who performs maintenance at all times near the robot.

SUMMARY

The present disclosure has been made to solve such a problem. A main object of the present disclosure is to provide a failure diagnosis support system and a failure diagnosis support method of a robot capable of reducing a human load and easily determining a cause of a failure of a robot.

An example aspect of the present disclosure to achieve the above object may be a failure diagnosis support system of a robot for diagnosing whether or not a part of the robot is faulty. The failure diagnosis support system includes: first image acquisition means mounted on a robot for acquiring an image of the robot; and control means for controlling position and orientation of the first image acquisition means. The control means controls the position and orientation of the first image acquisition means at a predetermined timing so that the first image acquisition means faces a predetermined part of the robot. The first image acquisition means acquires an image of the predetermined part at the position and orientation controlled by the control means.

In this example aspect, the failure diagnosis support system of a robot further includes: part identifying means for identifying a failed part of the robot; and storage means for storing table information, the table information including associations between the failed part of the robot and the position and orientation of the first image acquisition means that enable an image of the failed part to be acquired. The control means may control the position and orientation of the first image acquisition means to be at a position and orientation corresponding to the failed part identified by the part identifying means.

In this example aspect, the failure diagnosis support system of a robot further includes acquisition evaluation means for evaluating, based on the failed part of the robot identified by the part identifying means, as to whether or not the first image acquisition means can acquire the image of the failed part. When the acquisition evaluation means evaluates that the image of the failed part identified by the part identifying means cannot be acquired, the control means may control the positions and orientations of the first image acquisition means and the robot so that the first acquisition means can acquire the image of the failed part reflected on a reflection member disposed in an environment where the robot moves.

In this example aspect, the failure diagnosis support system of a robot further includes: second image acquisition means disposed in the environment where the robot moves for acquiring the image of the robot; and acquisition evaluation means for evaluating, based on the failed part of the robot identified by the part identifying means, as to whether or not the first image acquisition means can acquire the image of the failed part. When the acquisition evaluation means evaluates that the first image acquisition means cannot acquire the image of the failed part identified by the part identifying means, the second image acquisition means may acquire the image of the failed part identified by the part identifying means.

In this example aspect, the failure diagnosis support system of a robot, the second image acquisition means is provided to an installation member or another robot disposed in the environment, the storage means stores table information in which the failed part of the robot is associated with the position and orientation of the robot when the second image acquisition means acquires the image of the failed part of the robot, and the control means controls, based on the table information in the storage means, the position and orientation of the robot to be at a position and orientation corresponding to the failed part, in which the acquisition evaluation means has evaluated that the image of the failed part cannot be acquired.

Another example aspect of the present disclosure to achieve the above object may be a failure diagnosis support method of a robot for supporting a determination as to whether or not there is a failure in a predetermined part of the robot. The failure diagnosis support method includes: controlling position and orientation of first image acquisition means at a predetermined timing so that the first image acquisition means mounted on the robot for acquiring an image of the robot faces the predetermined part of the robot; and acquiring, by the first image acquisition means, an image of the predetermined part at the controlled position and orientation.

According to the present disclosure, it is possible to provide a failure diagnosis support system and a failure diagnosis support method of a robot capable of reducing a human load and easily determining a cause of a failure of a robot.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
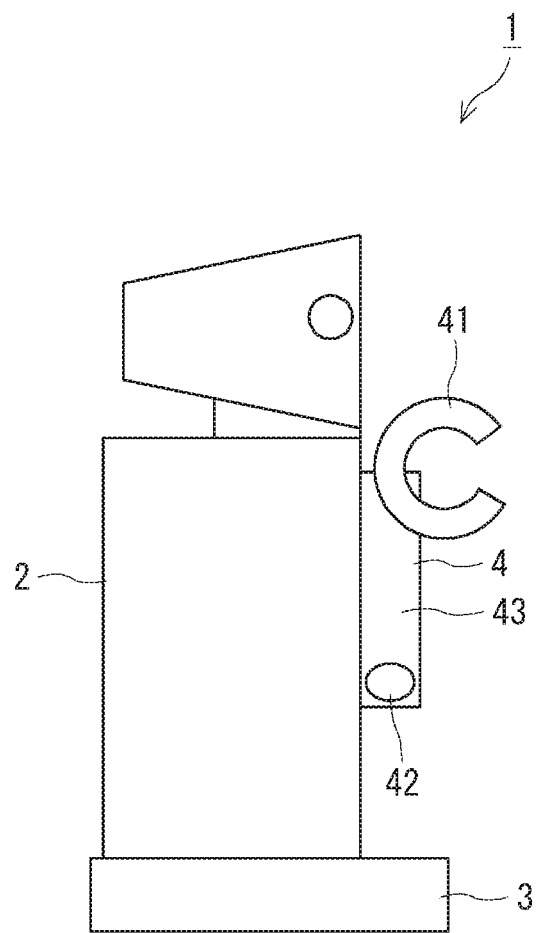
FIG. 1 is a schematic diagram showing a schematic configuration of a robot according to a first embodiment of the present disclosure.

Hereinafter, embodiments of the present disclosure will be described with reference to the drawings. FIG. 1 is a schematic diagram showing a schematic configuration of a robot according to a first embodiment of the present disclosure. For example, a robot 1 is configured as an autonomous work robot that autonomously performs a work. The failure diagnosis support system of the first embodiment supports diagnosing whether or not a part of the robot is faulty. For example, in order to stably operate the robot 1, the failure diagnosis support system diagnoses a failure of the robot 1, automatically acquires information effective for enabling the robot 1 to recover from the failure, and provides the information to a user such as a person in charge of maintenance.

Figure 2:
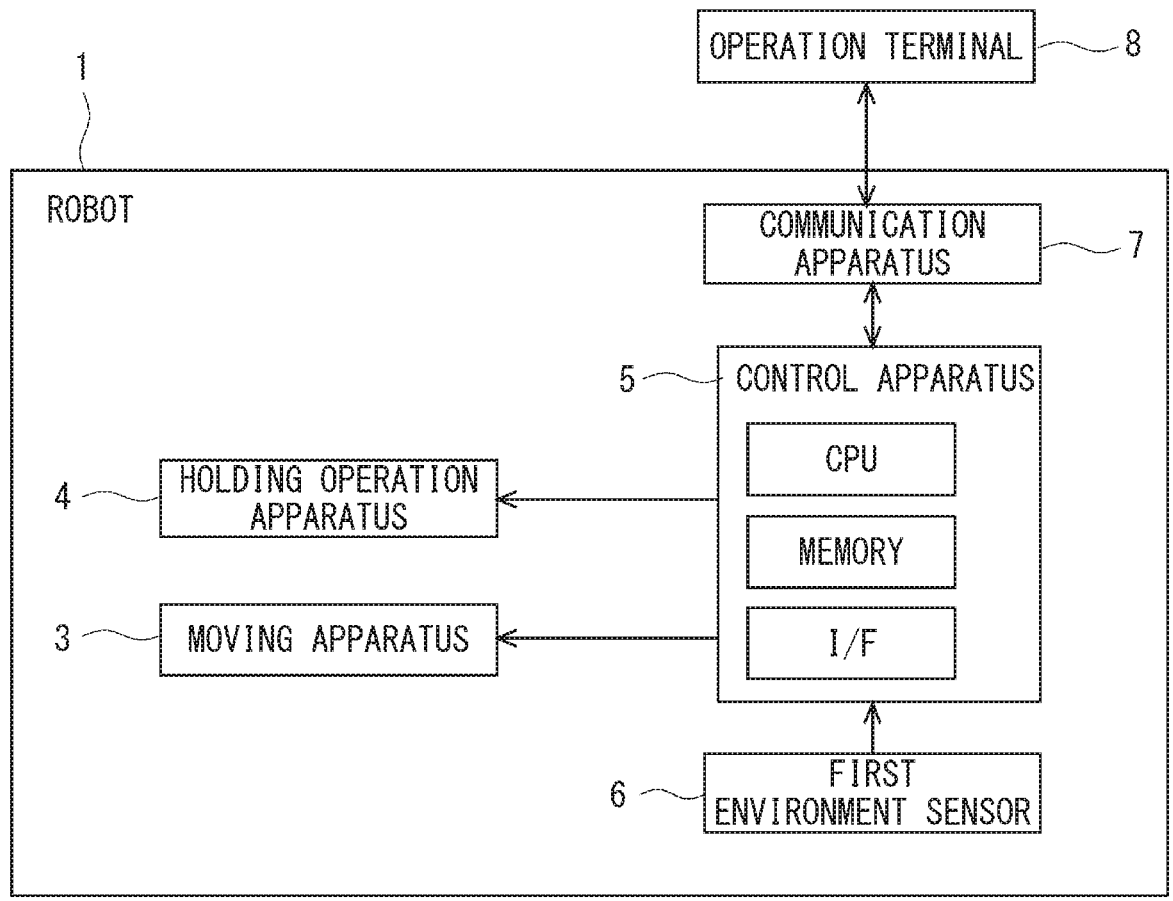
FIG. 2 is a block diagram showing a schematic configuration of the robot according to the first embodiment of the present disclosure.

FIG. 2 is a block diagram showing a schematic configuration of the robot according to the first embodiment. The robot 1 includes a robot body 2, a moving apparatus 3 for moving the robot body 2, a holding operation apparatus 4 for holding and moving an object, a control apparatus 5 for controlling the moving apparatus 3 and the holding operation apparatus 4, a first environmental sensor 6, and a communication apparatus 7.

In response to a control signal from the control apparatus 5, the moving apparatus 3 rotates a plurality of wheels, for example, by driving a motor or the like, and moves the robot body 2 to a desired position.

The holding operation apparatus 4 is configured as a multi-joint arm. The multi-joint arm includes, for example, a holding part 41 for holding the object, a plurality of links 43 connected via joint parts 42 such as a wrist joint, an elbow joint, a shoulder joint, and the like, and a plurality of actuators such as motors for driving the respective joint parts 42.

The control apparatus 5 controls the moving apparatus 3 and the holding operation apparatus 4 based on an operation signal transmitted from an operation terminal 8 to thereby cause the robot 1 to perform a work.

The communication apparatus 7 receives the operation signal transmitted from the operation terminal 8 and transmits the received operation signal to the control apparatus 5. The operation terminal 8 is, for example, a mobile terminal such as a tablet terminal, a PC (Personal Computer), a smartphone, or the like. The operation terminal 8 is held, for example, by an operator who operates the robot 1, a user such as a person in charge of maintaining the robot 1, or the like. The operation terminal 8 is provided with a touch panel and mechanical switches. The user can input operation information for operating the robot 1 to the operation terminal 8 by operating the panel and mechanical switches.

The communication apparatus 7 transmits image information of the robot 1 acquired by the first environmental sensor 6 and the like to the operation terminal 8. The operation terminal 8 has a function of receiving the image information of the robot 1 and the like transmitted from the communication apparatus 7 and displaying them. The operation terminal 8 and the communication apparatus 7 are communicatively connected to each other wirelessly (WiFi (registered trademark), Bluetooth (registered trademark), wireless LAN, etc.) and transmit and receive data to and from each other. The operation terminal 8 outputs the operation signal corresponding to the work information input by the user to the communication apparatus 7. On the other hand, the operation terminal 8 receives and displays the image information and the like transmitted from the communication apparatus 7. Then, the user can check the image information and the like from the robot 1 at the same time as remotely operating the robot 1.

The first environmental sensor 6 acquires environment information of the robot 1 and a surrounding environment. The first environmental sensor 6 is mounted on, for example, a head part connected to the robot body 2 with a neck joint interposed therebetween, on the holding operation apparatus 4, and the like. However, the present disclosure is not limited to this. A plurality of first environmental sensors 6 may be provided at arbitrary positions on the robot 1.

The first environmental sensor 6 is, for example, a distance sensor such as a camera (RGB-D camera, stereo camera), a laser range finder, an ultrasonic sensor, or the like. The first environmental sensor 6 acquires distance information (including the image information) indicating a distance between the robot 1 and an obstacle. The first environmental sensor 6 transmits environment information such as the acquired distance information to the control apparatus 5.

Incidentally, for example, the person in charge of maintenance can easily and remotely determine whether or not a sensor or the like of the robot is faulty. However, it may be sometimes difficult to determine a cause of a failure that occurs due to an external factor such as distortion or biting of a part. In this case, when the person in charge of maintenance directly checks the robot, the cause of the failure can be easily determined. However, it requires a large human load to deploy a person at all times near the robot.

On the other hand, the failure diagnosis support system 10 according to the first embodiment controls position and orientation of the first environmental sensor 6 so that the first environmental sensor 6 faces a predetermined part of the robot 1 at a predetermined timing. The first environmental sensor 6 acquires an image of the predetermined part at the controlled position and orientation.

Thus, the user can check the image of the predetermined part of the robot 1 acquired by the first environmental sensor 6 at the predetermined timing. Therefore, even when the user is not near the robot 1, the cause of the failure and the like can be easily determined. That is, as it is not necessary to deploy a person near the robot 1, the human load can be reduced and the cause of the failure of the robot 1 can be easily determined.

Figure 3:
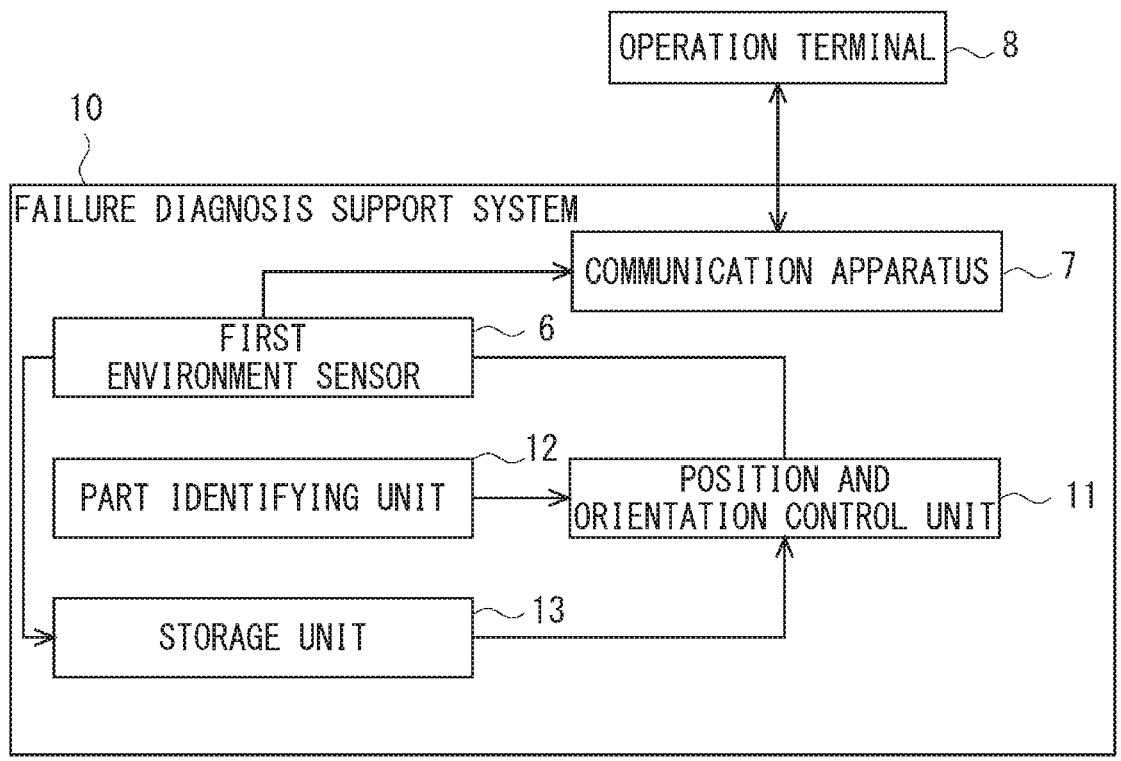
FIG. 3 is a block diagram showing a schematic configuration of a failure diagnosis support system according to the first embodiment of the present disclosure.

FIG. 3 is a block diagram showing a schematic configuration of a failure diagnosis support system according to the first embodiment. The failure diagnosis support system 10 according to the first embodiment includes, for example, the first environmental sensor 6 mounted on the robot 1 for acquiring an image of the robot 1, a position and orientation control unit 11 for controlling the position and orientation of the first environmental sensor 6, a part identifying unit 12 for identifying a failed part of the robot 1, and a storage unit 13 for storing table information. In the table information, the failed parts of the robot 1 are associated with the positions and orientations of the first environmental sensor 6 that enable the image of the failed part to be acquired.

Figure 4:
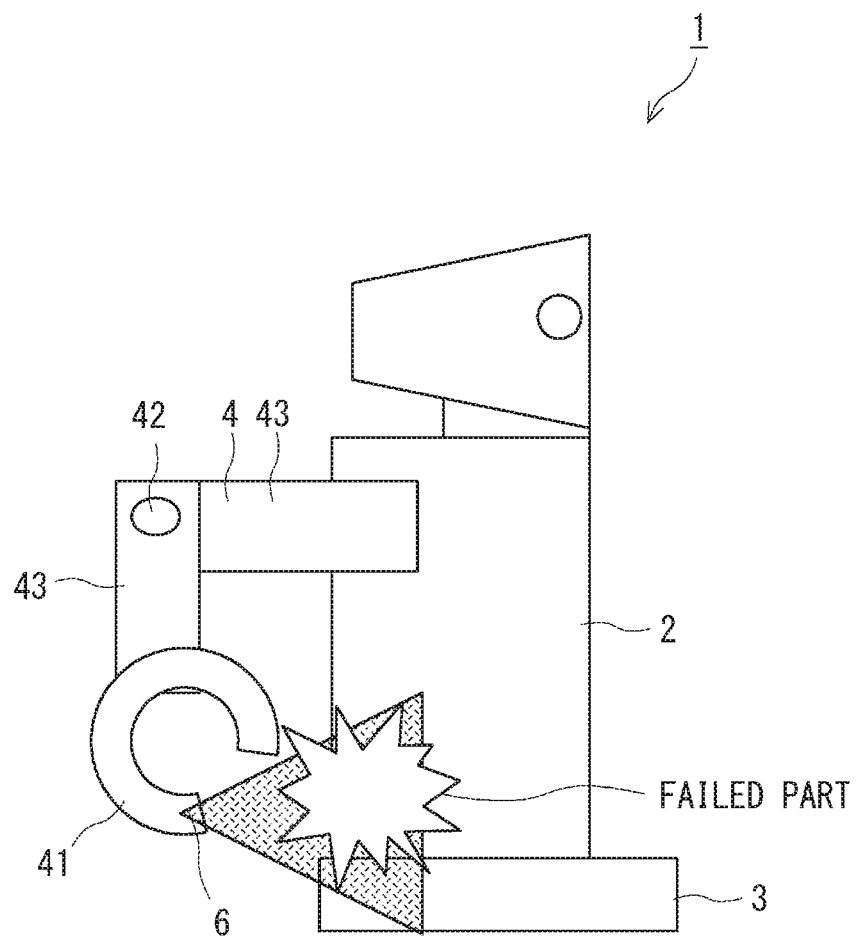
FIG. 4 is a diagram showing a state in which a first environmental sensor acquires an image of a failed part at a position and orientation controlled by a position and orientation control unit.

The position and orientation control unit 11 controls the position and orientation of the first environmental sensor 6 to be at the position and orientation corresponding to the failed part identified by the part identifying unit 12 based on the table information in the storage unit 13 (FIG. 4). The first environmental sensor 6 acquires the image of the failed part at the position and orientation controlled by the position and orientation control unit 11.

Thus, the user can easily determine the cause of the failure even if he/she is not near the robot 1 by checking the image of the failed part of the robot 1 acquired by the first environmental sensor 6. That is, as it is not necessary to deploy a person near the robot 1, the human load can be reduced and the cause of the failure of the robot 1 can be easily determined.

A hardware configuration of the failure diagnosis support system 10 mainly includes, for example, a CPU (Central Processing Unit), a memory and a microcomputer. The CPU performs control processing, calculation processing, and the like. The memory is composed of a ROM (Read Only Memory) and a RAM (Random Access Memory) storing a control program, a calculation program, and the like to be executed by the CPU. The microcomputer is composed of an interface unit (I/F) that inputs and outputs signals from and to the outside. The CPU, the memory, and the interface unit are connected to one another through a data bus or the like.

The first environmental sensor 6 is a specific example of first image acquisition means. The first environmental sensor 6 is, for example, a hand-held camera provided in the holding part 41 of the holding operation apparatus 4 of the robot 1 or a head camera provided on the head part of the robot 1.

The position and orientation control unit 11 is a specific example of control means. The position and orientation control unit 11, for example, controls the actuators of the respective joint parts 42 of the holding operation apparatus 4 and the actuator of the neck joint to thereby control the position and the orientation of the respective first environmental sensors 6.

The part identifying unit 12 is a specific example of part identifying means. The part identifying unit 12, for example, executes a self-diagnosis program set in the storage unit 13 and performs failure diagnosis of the robot 1 with reference to a self-diagnosis table.

For example, in the self-diagnosis table, the diagnostic parts of the robot 1 performing the self-diagnosis, the diagnostic methods of the diagnostic parts, the position information of the diagnostic parts (three-dimensional coordinate system etc.), and the like are set in association with one another. Examples of the diagnostic parts of the robot 1 include, for example, parts related to the sensor (a camera (a lens, a cover, etc.), a laser (a projected surface, a cover, etc.), a bumper (a cover etc.), a battery (a connector etc.), parts related to the holding operation apparatus 4 (the joint parts, the links, the actuators, the holding part etc.), parts related to the moving apparatus 3, parts related to input/output of the robot 1 (a display (liquid crystal), an LED, a microphone, a speaker), parts of the robot body 2, and the like. The methods for diagnosing the diagnostic parts include visual check, operation check, signal processing check (comparison between signal and threshold, etc.), and the like.

For example, the part identifying unit 12 automatically executes the self-diagnosis program at a preset predetermined date and time during predetermined processing (battery charging of the robot 1). The part identifying unit 12 may execute the self-diagnosis program on the diagnostic part input via the operation terminal 8 or the like. The operation terminal 8 may display a three-dimensional model of the robot 1, and when a user specifies the diagnostic part on the three-dimensional model, the diagnostic part may be input. The user may input the diagnostic part to the operation terminal 8 or the like based on defect information from a third party.

Further, the part identifying unit 12 may automatically execute the self-diagnosis program based on sensor information of the robot 1. For example, when the part identifying unit 12 determines that the sensor value (temperature, motor torque, etc.) output from the sensor of the robot 1 becomes equal to or greater than a threshold or becomes equal to or lower than the threshold, the part identifying unit 12 automatically executes the self-diagnosis program.

When the part identifying unit 12 executes the self-diagnosis program, as descried above, the part identifying unit 12 performs failure diagnosis on the diagnostic part according to the diagnostic method that corresponds to the diagnostic part set in the self-diagnosis table to identify the failed part.

As a result of the above failure diagnosis, the part identifying unit 12 can identify the failed part (determine whether the part is normal or abnormal). However, it may be difficult to obtain detailed contents of the failure. Further, it may be difficult to make a determination as to what kind of actions, such as repairing, is required for the failed part.

Therefore, in the first embodiment, as described above, the storage unit 13 further stores failure table information. In the failure table information, failed parts determined to be failures by the failure diagnosis are associated with the positions and orientations of the first environmental sensor 6 that enable the first environmental sensor 6 to acquire images of the failed parts. The position and orientation control unit 11 controls the position and orientation of the first environmental sensor 6 to be at the position and orientation corresponding to the failed part identified by the part identifying unit 12 based on the failure table information in the storage unit 13.

The failure table information is one specific example of table information. The first environmental sensor 6 acquires an image of the failed part at the position and orientation controlled by the position and orientation control unit 11. The user can remotely determine a cause of the failure and an action such as repairing to be taken for the failed part by referring to the image of the failed part via the operation terminal 8, the storage unit 13, and the like.

For example, the position and orientation of the first environmental sensor 6 set in the failure table information are relative positions and orientations with respect to the failed part and are set in a three-dimensional coordinate system or the like.

The part identifying unit 12 identifies the position and orientation of the first environmental sensor 6 corresponding to the failed part identified by the part identifying unit 12 based on the failure table information in the storage unit 13. The position and orientation control unit 11 controls the actuators of the respective joint parts 42 of the holding operation apparatus 4 and the actuator of the neck joint, thereby setting the first environmental sensor 6 to the position and orientation identified by the part identifying unit 12.

The storage unit 13 is a specific example of storage means. The storage unit 13 is composed of, for example, a memory and the like. The storage unit 13 sequentially stores the image information and the like of the robot 1 transmitted from the first environmental sensor 6. The person in charge of maintenance or the like can display and check, as necessary, the image information of the robot 1 stored in the storage unit 13 on a display apparatus or the like.

Note that, for example, the storage unit 13 may previously set therein, via the operation terminal 8 or the like, the parts of the robot 1 where failures are suspected or where it is highly possible that failures may occur and thus require the user to periodically check these parts. The part identifying unit 12 may identify the failed part based on the information of the parts set in the storage unit 13 without performing the above failure diagnosis.

Figure 5:
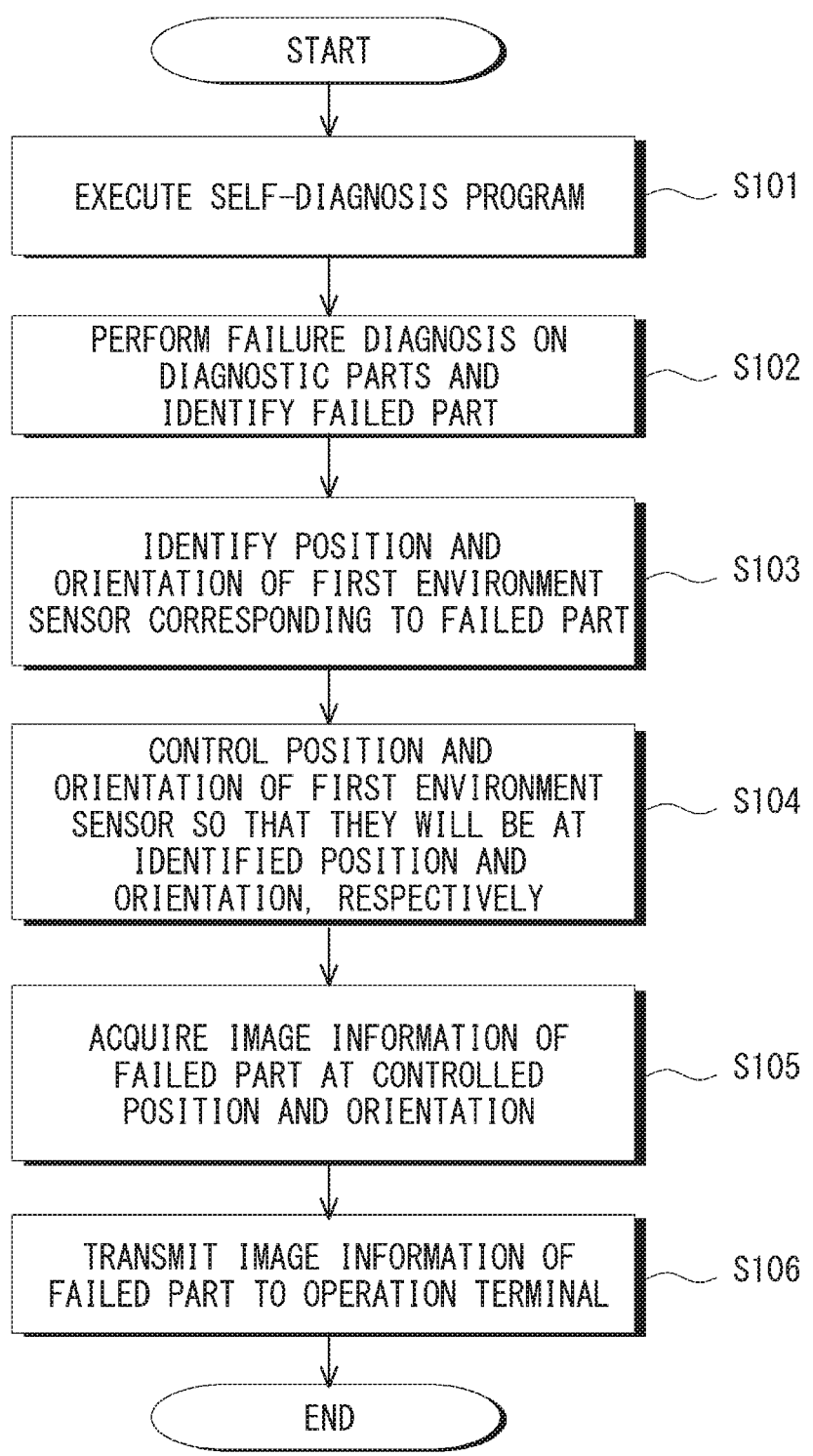
FIG. 5 is a flowchart showing an example of a processing flow of a failure diagnosis support method according to the first embodiment of the present disclosure.

FIG. 5 is a flowchart showing an example of the processing flow of the failure diagnosis support method according to the first embodiment.

The part identifying unit 12 executes the self-diagnosis program set in the storage unit 13 (Step S101). The part identifying unit 12 performs the failure diagnosis on each diagnostic part set in the self-diagnosis table of the storage unit 13 according to the corresponding diagnostic method to identify the failed part (Step S102).

The part identifying unit 12 identifies the position and orientation of the first environmental sensor 6 corresponding to the identified failed part based on the failure table information in the storage unit 13 (Step S103).

The position and orientation control unit 11 controls the actuator of each joint part 42 of the holding operation apparatus 4 and the actuator of the neck joint so as to control the position and orientation of the first environmental sensor 6 to be at the position and orientation identified by the part identifying unit 12 (Step S104).

The first environmental sensor 6 acquires the image information of the failed part at the position and orientation controlled by the position and orientation control unit 11 (Step S105).

The communication apparatus 7 transmits the image information of the failed part acquired by the first environmental sensor 6 to the operation terminal 8 (Step S106). The operation terminal 8 receives the image information of the failed part transmitted from the communication apparatus 7 and displays it on a display screen. Then, the user can remotely obtain the detailed contents of the failure and the like by referring to the image information of the failed part and easily determine the cause of the failure.

Note that the communication apparatus 7 may transmit the image information of the failed part acquired by the first environmental sensor 6 to a server or the like that manages the robot 1. Further, the communication apparatus 7 may attach the image information of the failed part acquired by the first environmental sensor 6 to a mail or the like in order to transmit the image information to the operation terminal 8 of the person in charge of maintenance.

As described above, in the failure diagnosis support system 10 according to the first embodiment, the position and orientation control unit 11 controls the position and orientation of the first environmental sensor 6 to be at the position and orientation corresponding to the failed part identified by the part identifying unit 12 based on the table information in the storage unit 13. The first environmental sensor 6 acquires the image information of the failed part at the position and orientation controlled by the position and orientation control unit 11.

In this manner, the user can easily determine the cause of the failure even without being near the robot 1 by checking the image of the failed part of the robot 1 acquired by the first environmental sensor 6. That is, as it is not necessary to deploy a person near the robot 1, the human load can be reduced and the cause of the failure of the robot 1 can be easily determined.

Second Embodiment

Figure 6:
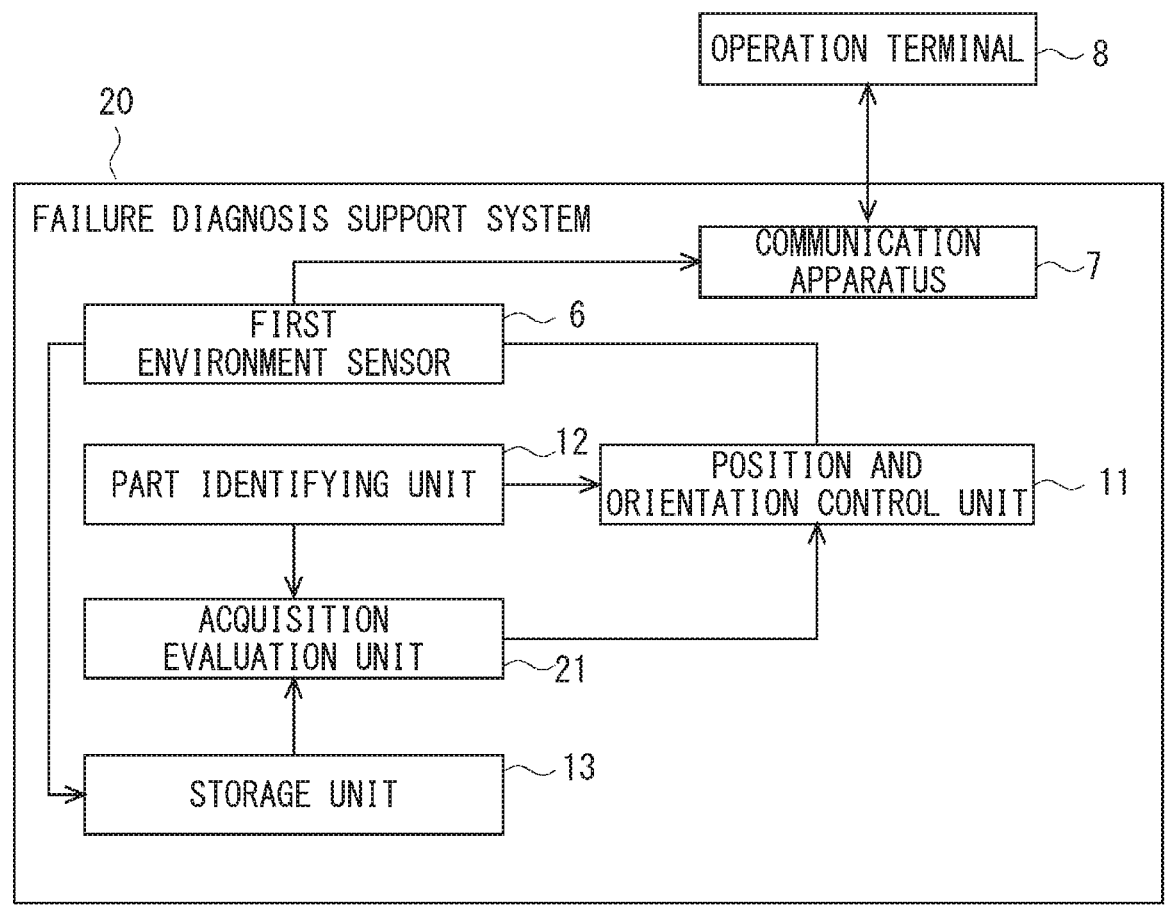
FIG. 6 is a block diagram showing a schematic system configuration of a failure diagnosis support system according to a second embodiment of the present disclosure.

FIG. 6 is a block diagram showing a schematic configuration of a failure diagnosis support system according to a second embodiment of the present disclosure. In addition to the configuration of the failure diagnosis support system 10 according to the first embodiment, the failure diagnosis support system 20 according to the second embodiment further includes an acquisition evaluation unit 21. The acquisition evaluation unit 21 evaluates, based on the failed part of the robot 1 identified by the part identifying unit 12 and failure table information stored in the storage unit 13, as to whether or not the first environmental sensor 6 can acquire an image of a failed part.

Figure 7:
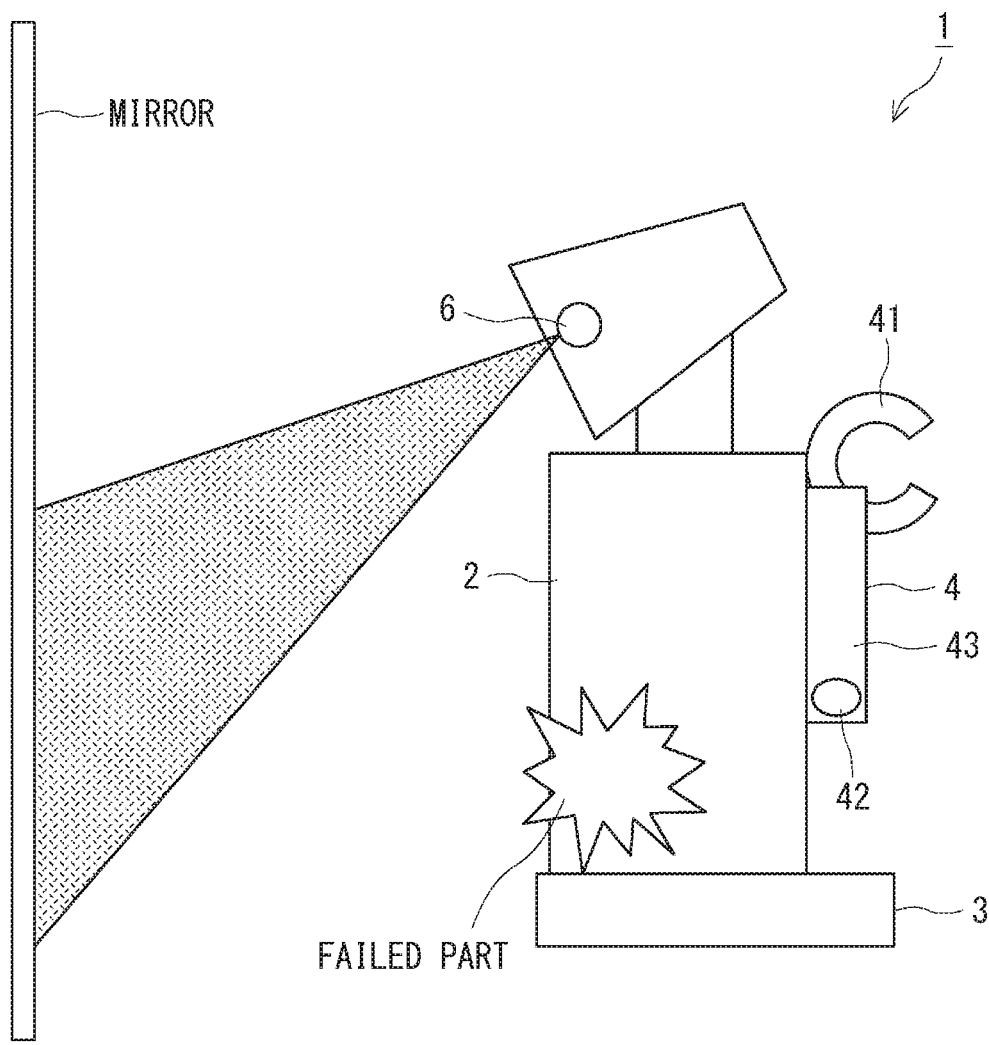
FIG. 7 is a diagram showing a state in which a first environmental sensor acquires an image of a failed part reflected on a reflection member disposed in a moving environment.

When the acquisition evaluation unit 21 evaluates that the image of the failed part identified by the part identifying unit 12 can be acquired, it outputs, to the position and orientation control unit 11, a result of the evaluation that the image of the failed part cannot be acquired. The position and orientation control unit 11 controls the position and orientation of the first environmental sensor 6 and the robot 1 according to the result of the evaluation from the acquisition evaluation unit 21 that the image of the failed part cannot be acquired so that the first environmental sensor 6 can acquire the image of the failed part reflected on a reflection member M disposed in an environment where the robot 1 moves (FIG. 7). Thus, even when the first environmental sensor 6 cannot directly acquire the image of the failed part, the image of the failed part can be acquired indirectly by using the reflection member M. Therefore, it is possible to easily determine the cause of the failure by using the image of the failed part.

The acquisition evaluation unit 21 is a specific example of acquisition evaluation means. For example, when the failed part of the robot 1 identified by the part identifying unit 12 is not associated with the position and orientation of the first environmental sensor 6 in the failure table, the acquisition evaluation unit 21 evaluates that the image of the failed part identified by the part identifying unit 12 cannot be acquired.

This is because of the following reason. As described above, in the failure table information, the failed part determined to be a failure by the failure diagnosis is associated with the position and orientation of the first environmental sensor 6 that enable the first environmental sensor 6 to acquire the image of the failed part. Therefore, in the failure table information, when the failed part determined to be a failure by the failure diagnosis is not associated with the position and orientation of the first environmental sensor 6, the first environmental sensor 6 cannot acquire the image of the failed part.

Further, when the acquisition determination unit 21 determines, based on output signals from the respective first environmental sensors 6, that all the first environmental sensors 6 associated with the failed parts of the robot 1 identified by the part identifying unit 12 are abnormal, the acquisition evaluation unit 21 may evaluate that the image of the failed part identified by the part identifying unit 12 cannot be acquired.

The reflection member M is, for example, a mirror disposed in advance in the moving environment of the robot 1. The storage unit 13 stores mirror table information. In the mirror table information, the failed parts are associated with the positions and orientations of the robot 1 and the first environmental sensor 6 when the first environmental sensor 6 acquires the image of the failed part reflected on the reflection member M.

For example, the position and orientation of the robot 1 and the first environmental sensor 6 set in the mirror table information are relative positions and orientations with respect to the reflection member M and are set in a three-dimensional coordinate system or the like. The position and orientation of the robot 1 and the first environmental sensor 6, which enable the first environmental sensor 6 to acquire the image of the failed part reflected on the reflection member M, are calculated based on the position, orientation, shape etc. of the reflection member M and are set in the mirror table information.

The position and orientation control unit 11 controls, based on the mirror table information in the storage unit 13, the positions and orientations of the first environmental sensor 6 and the robot 1 to be at positions and postures corresponding to the failed part, in which the acquisition evaluation unit 21 has evaluated that the image of the failed part cannot be acquired. The first environmental sensor 6 acquires the image of the failed part reflected on the reflection member M at the position and orientation controlled by the position and orientation control unit 11.

In the failure diagnosis support system 20 according to the second embodiment, the same components as those of the failure diagnosis support system 10 according to the first embodiment are denoted by the same reference numerals, and detailed descriptions thereof will be omitted.

Figure 8:
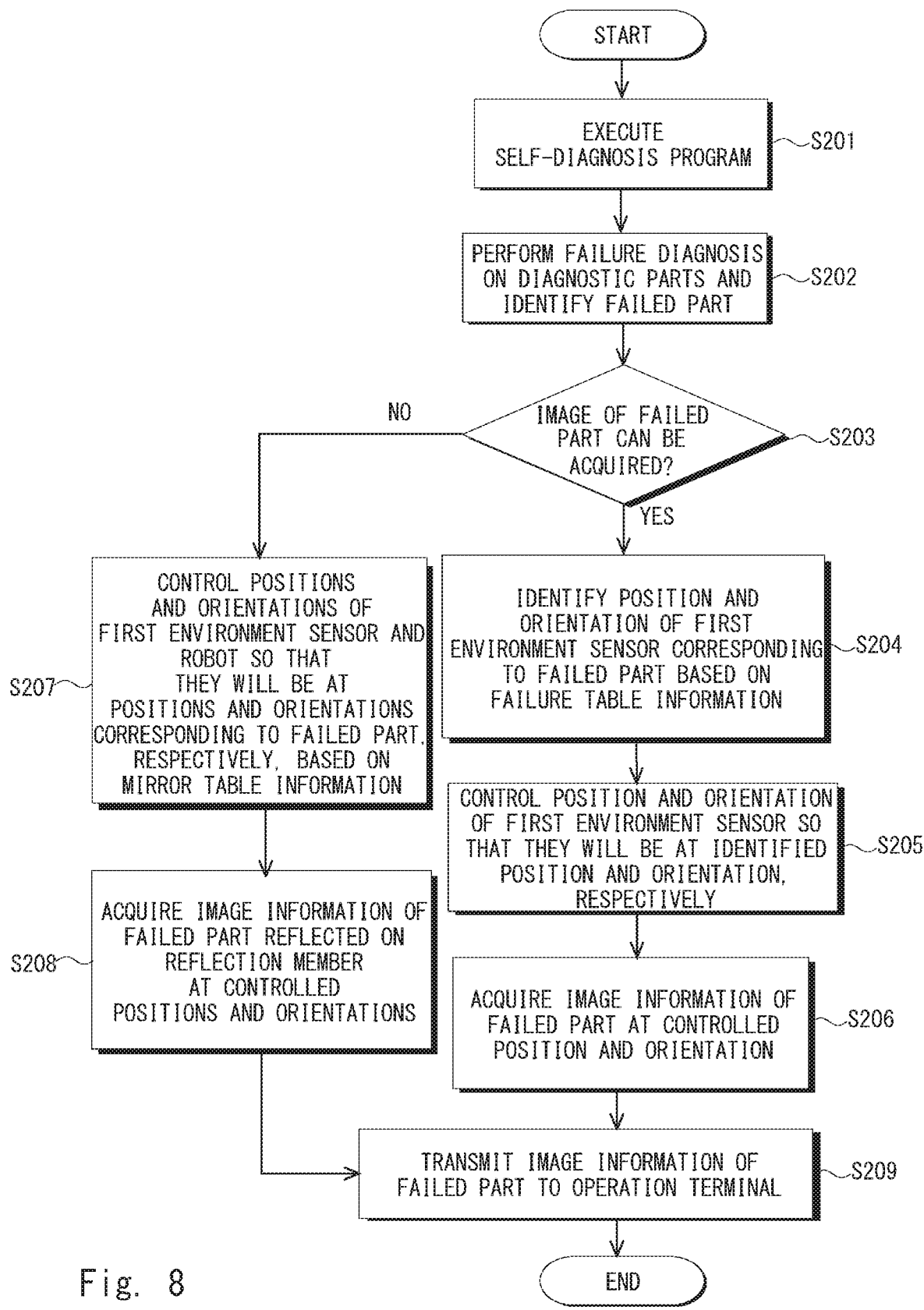
FIG. 8 is a flowchart showing an example of a processing flow of a failure diagnosis support method according to the second embodiment of the present disclosure.

FIG. 8 is a flowchart showing an example of the processing flow of the failure diagnosis support method according to the second embodiment.

The part identifying unit 12 executes the self-diagnosis program set in the storage unit 13 (Step S201). The part identifying unit 12 performs the failure diagnosis on each diagnostic part set in the self-diagnosis table of the storage unit 13 according to the corresponding diagnostic method to identify the failed part (Step S202).

The acquisition evaluation unit 21 evaluates, based on the failed part of the robot 1 identified by the part identifying unit 12 and the failure table information stored in the storage unit 13, as to whether or not the first environmental sensor 6 can acquire the image of the failed part (Step S203).

When the acquisition evaluation unit 21 evaluates that it is possible to acquire the image of the failed part identified by the part identifying unit 12 (YES in Step S203), the part identifying unit 12 determines, based on the failure table information in the storage unit 13, the position and orientation of the first environmental sensor 6 corresponding to the identified failed part (Step S204). The position and orientation control unit 11 controls the position and orientation of the first environmental sensor 6 to be at the position and orientation identified by the part identifying unit 12 (Step S205). The first environmental sensor 6 acquires the image information of the failed part at the position and orientation controlled by the position and orientation control unit 11 (Step S206). Then, the process transitions to Step S209, which will be described later.

On the other hand, when the acquisition evaluation unit 21 evaluates that the image of the failed part identified by the part identifying unit 12 cannot be acquired (NO in Step S203), the position and orientation control unit 11 controls the positions and orientations of the first environmental sensor 6 and the robot 1 to be at the positions and orientations corresponding to the failed part, in which the acquisition evaluation unit 21 has evaluated, based on the mirror table information in the storage unit 13, that the image of the failed part cannot be acquired (Step S207). The first environmental sensor 6 acquires the image of the failed part reflected on the reflection member M at the position and orientation controlled by the position and orientation control unit 11 (Step S208). Then, the process transitions to Step S209, which will be described later.

The communication apparatus 7 transmits the image information of the failed part acquired by the first environmental sensor 6 to the operation terminal 8 (Step S209). The operation terminal 8 receives the image information of the failed part transmitted from the communication apparatus 7 and displays it on a display screen. Thus, even when the first environmental sensor 6 cannot directly acquire the image of the failed part, the image of the failed part can be acquired indirectly by using the reflection member M. Further, the user can remotely obtain the detailed contents of the failure and the like by referring to the image information of the failed part and easily determine the cause of the failure.

Third Embodiment

Figure 9:
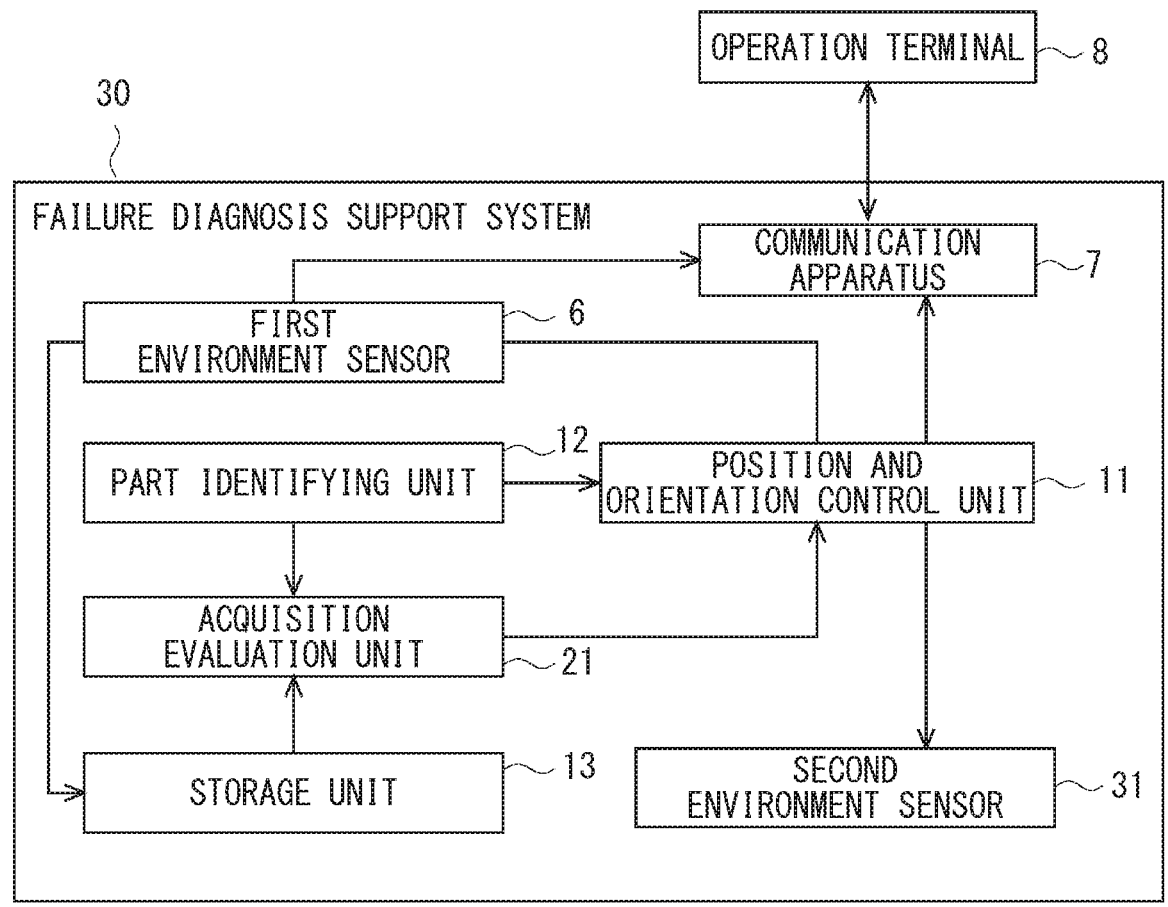
FIG. 9 is a block diagram showing a schematic configuration of a failure diagnosis support system according to a third embodiment of the present disclosure.

FIG. 9 is a block diagram showing a schematic configuration of a failure diagnosis support system according to a third embodiment of the present disclosure. In addition to the configuration of the failure diagnosis support system according to the first embodiment, a failure diagnosis support system 30 according to the third embodiment further includes a second environmental sensor 31 and an acquisition evaluation unit 21. The second environmental sensor 31 acquires an image of the robot 1 that is disposed in a moving environment and that includes the first environmental sensor 6. The acquisition evaluation unit 21 evaluates as to whether or not the first environmental sensor 6 can acquire an image of a failed part.

When the acquisition evaluation unit 21 evaluates that the image of the failed part identified by the part identifying unit 12 cannot be acquired, the second environmental sensor 31 acquires the image of the failed part identified by the part identifying unit 12. The second environmental sensor 31 transmits the acquired image of the failed part to the operation terminal 8, the robot 1, and the like.

In this way, even when the first environmental sensor 6 cannot acquire the image of the failed part of the robot 1, the second environmental sensor 31 can acquire the image of the failed part of the robot 1. Therefore, it is possible to easily determine the cause of failure of the robot 1 by referring to the image of the failed part of the second environmental sensor 31.

One or more of the second environmental sensors 31 are provided to another robot (another robot or the other robot), installation members such as support columns, walls, and ceilings disposed in the moving environment of the robot 1. The second environmental sensor 31 wirelessly transmits the acquired image information of the robot 1 and the like to the communication apparatus 7 of the robot 1 or the like.

Figure 10:
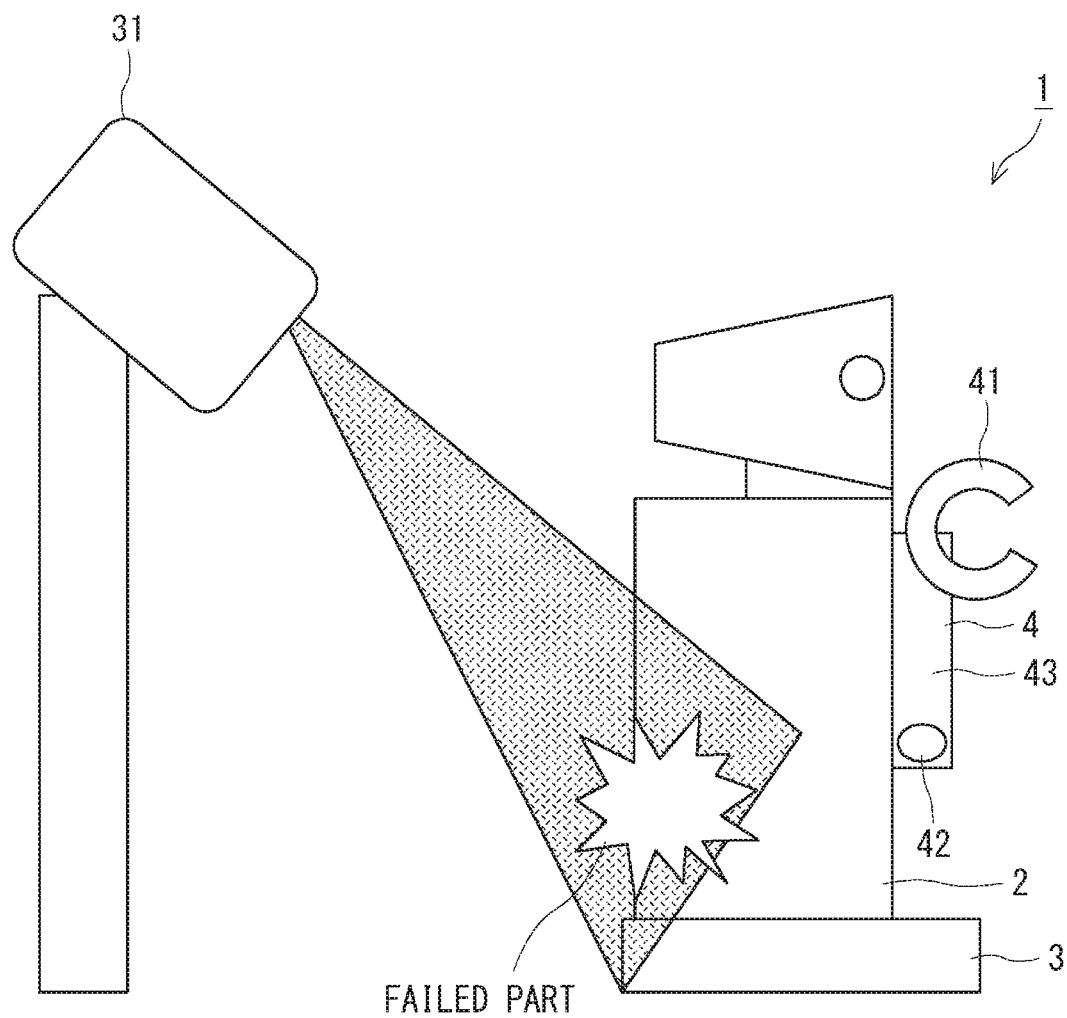
FIG. 10 is a diagram showing a state in which a second environmental sensor disposed on an installation member acquires an image of a failed part of a robot itself.

First, as shown in FIG. 10, a case where the second environmental sensor 31 is disposed on the installation member will be described.

The storage unit 13 stores the sensor table information in which the failed parts of the robot 1 and the positions and the orientations of the robot 1 when the second environmental sensor 31 acquires the image of the failed part of the robot 1 are associated.

For example, the position and orientation of the robot 1 set in the sensor table information are the relative positions and orientations with respect to the second environmental sensor 31 and are set in a three-dimensional coordinate system or the like. For example, the position and orientation of the robot 1 that enable the image of each failed part of the robot 1 to be acquired are calculated based on the position and orientation of the second environmental sensor 31 and set in the sensor table information.

The position and orientation control unit 11 controls the position and orientation of the robot 1 to be at a position and orientation corresponding to the failed part, in which the acquisition evaluation unit 21 has evaluated, based on the sensor table information in the storage unit 13, that the image of the failed part cannot be acquired. The position and orientation control unit 11 transmits a control signal to the second environmental sensor via the communication apparatus 7. In response to the control signal from the position and orientation control unit 11, the second environmental sensor 31 acquires the image of the failed part of the robot 1 controlled by the position and orientation control unit 11.

When the position and orientation control unit 11 determines, based on the sensor table information in the storage unit 13, that the image of the failed part cannot be acquired at the position and orientation of the robot 1, the position and orientation control unit 11 may control the position and orientation of the second environmental sensor 31 in addition to controlling the position and orientation of the robot 1.

Figure 11:
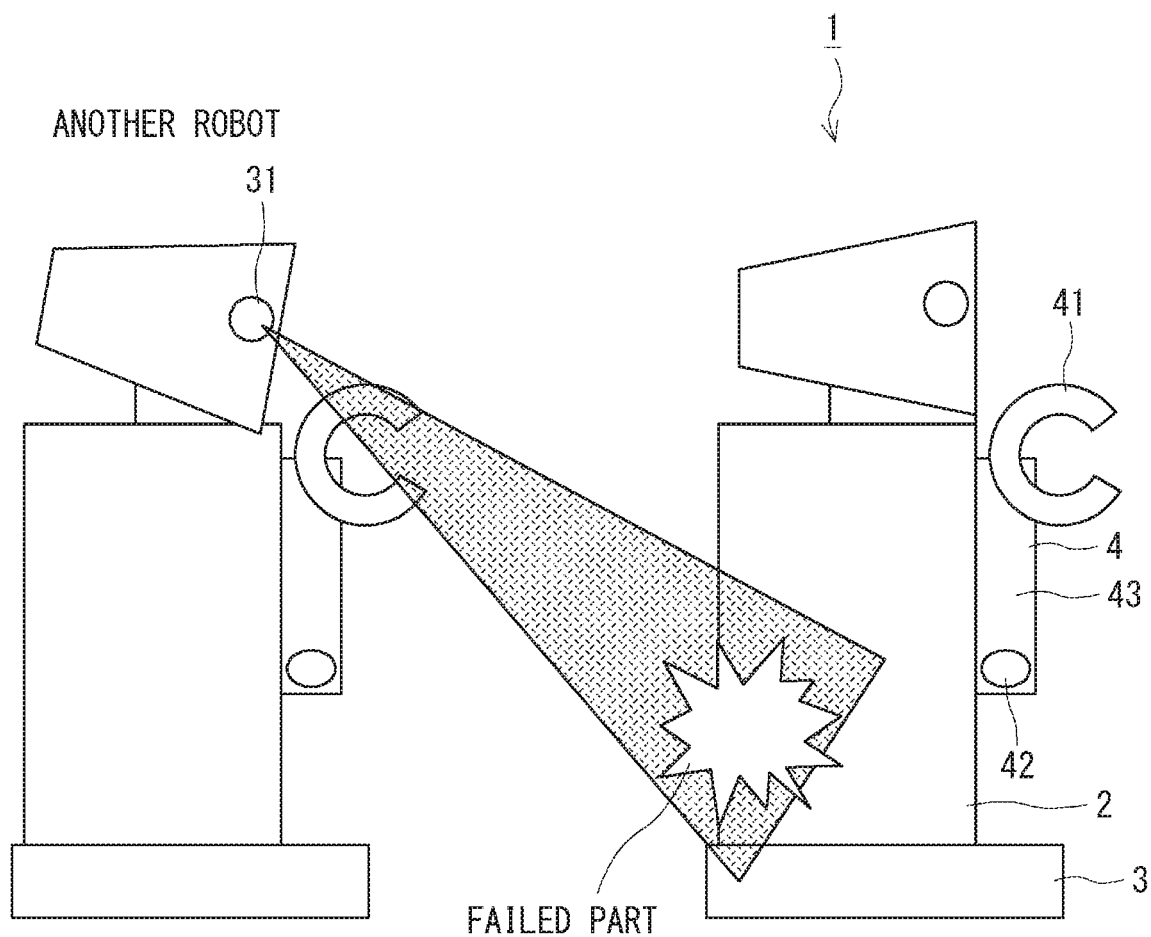
FIG. 11 is a diagram showing a state in which a second environmental sensor of another robot acquires the image of the failed part of the robot itself.

Next, as shown in FIG. 11, a case where the second environmental sensor 31 is disposed on another robot will be described.

The sensor table information is stored. In the sensor table information, the failed parts of the robot 1 are associated with the positions and orientations of the robot 1, the second environmental sensor 31, and the other robot when the second environmental sensor 31 of the other robot acquires the image of the failed part of the robot 1.

For example, the positions and orientations of the robot 1, the second environmental sensor 31, and other robot set in the sensor table information are set in a three-dimensional coordinate system or the like. For example, the position and orientation of the robot 1 that enable the image of the failed part of the robot 1 to be acquired are calculated based on the positions and orientations of the second environmental sensor 31 and the other robot and set in the sensor table information.

The position and orientation control unit 11 controls the position and orientation of the robot 1 to be at the position and orientation corresponding to the failed part, in which the acquisition evaluation unit 21 has evaluated, based on the sensor table information in the storage unit 13, that the image of the failed part cannot be acquired.

When the position and orientation control unit 11 determines, based on the sensor table information in the storage unit 13 at the position and orientation of the robot 1, that the image of the failed part cannot be acquired, the position and orientation control unit 11 may control the position and orientation of the second environmental sensor 31 of the other robot in addition to controlling the position and orientation of the robot 1. When the position and orientation control unit 11 determines that it is difficult to control the robot 1, the position and orientation control unit 11 may control only the position and orientation of the other robot and the second environmental sensor 31.

The position and orientation control unit 11 transmits a control signal to the second environmental sensor via the communication apparatus 7. In response to the control signal from the position and orientation control unit 11, the second environmental sensor 31 of the other robot acquires the image of the failed part of the robot 1 controlled by the position and orientation control unit 11.

When there are a plurality of second environmental sensors 31 in the moving environment, the position and orientation control unit 11 may control the position and orientation with respect to the second environmental sensor 31 that is closest to the robot 1. The second environmental sensor closest to the robot 1 acquires the image of the failed part of the robot 1. In this way, it is possible to acquire the image of the failed part of the robot 1 more efficiently.

In the failure diagnosis support system 30 according to the third embodiment, the same components as those of the failure diagnosis support systems 10 and 20 according to the first and second embodiments, respectively, are denoted by the same reference numerals, and detailed descriptions thereof will be omitted.

The present disclosure is not limited to the above-described embodiments and can be appropriately changed without departing from the scope of the present disclosure.

For example, in the above embodiments, the robot 1 may be configured not to include the communication apparatus 7. In this case, the operation terminal and the robot 1 may be connected by wires. Alternatively, the operation terminal may be mounted on the robot 1. The first to third embodiments may be arbitrarily combined.

In the present disclosure, the processing shown in FIGS. 5 and 8 can be achieved, for example, by causing a CPU to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R, CD-R/W, and semiconductor memories (such as mask ROM, PROM (Programmable ROM), EPROM (Erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A failure diagnosis support system of a robot for diagnosing whether or not a part of the robot is faulty, the failure diagnosis support system comprising:
   first image acquisition means mounted on the robot for acquiring an image of the robot;
   control means for controlling position and orientation of the first image acquisition means;
   part identifying means for identifying a failed part of the robot; and
   storage means for storing table information, the table information including associations between the failed part of the robot and the position and orientation of the first image acquisition means that enable an image of the failed part to be acquired, wherein
   the control means controls the position and orientation of the first image acquisition means to be at a position and orientation corresponding to the failed part identified by the part identifying means,
   the first image acquisition means acquires an image of the predetermined part at the position and orientation controlled by the control means,
   the failure diagnosis support system further comprises acquisition evaluation means for evaluating, based on the failed part of the robot identified by the part identifying means, as to whether or not the first image acquisition means can acquire the image of the failed part, and
   when the acquisition evaluation means evaluates that the image of the failed part identified by the part identifying means cannot be acquired, the control means controls the positions and orientations of the first image acquisition means and the robot so that the first acquisition means can acquire the image of the failed part reflected on a reflection member disposed in an environment where the robot moves.

2. A failure diagnosis support system of a robot for diagnosing whether or not a part of the robot is faulty, the failure diagnosis support system comprising:
   first image acquisition means mounted on the robot for acquiring an image of the robot;
   control means for controlling position and orientation of the first image acquisition means;
   part identifying means for identifying a failed part of the robot; and
   storage means for storing table information, the table information including associations between the failed part of the robot and the position and orientation of the first image acquisition means that enable an image of the failed part to be acquired, wherein
   the control means controls the position and orientation of the first image acquisition means to be at a position and orientation corresponding to the failed part identified by the part identifying means,
   the first image acquisition means acquires an image of the predetermined part at the position and orientation controlled by the control means,
   the failure diagnosis support system further comprises:
      second image acquisition means disposed in an environment where the robot moves for acquiring the image of the robot; and
      acquisition evaluation means for evaluating, based on the failed part of the robot identified by the part identifying means, as to whether or not the first image acquisition means can acquire the image of the failed part,
   when the acquisition evaluation means evaluates that the first image acquisition means cannot acquire the image of the failed part identified by the part identifying means, the second image acquisition means acquires the image of the failed part identified by the part identifying means,
   the second image acquisition means is provided to an installation member or another robot disposed in the environment,
   the storage means stores table information in which the failed part of the robot is associated with the position and orientation of the robot when the second image acquisition means acquires the image of the failed part of the robot, and
   the control means controls, based on the table information in the storage means, the position and orientation of the robot to be at a position and orientation corresponding to the failed part, in which the acquisition evaluation means has evaluated that the image of the failed part cannot be acquired.

3. A failure diagnosis support method of a robot, the method comprising:
   identifying whether a predetermined part of the robot is a failed part;
   evaluating whether a first image acquisition means can acquire an image of the failed part;
   controlling, based on evaluating that the first image acquisition means cannot acquire the image of the failed part, position and orientation of the first image acquisition means and the robot so that the first acquisition means can acquire the image of the failed part reflected on a reflection member disposed in an environment where the robot moves;
   acquiring, by the first image acquisition means, the image of the predetermined part at the controlled position and orientation.

4. The failure diagnosis support method of the robot according to claim 3, wherein the controlling the position and the orientation of the first image acquisition means is performed based on table information stored in a storage means, the table information including associations between the failed part of the robot and the position and the orientation of the first image acquisition means that enable the image of the failed part to be acquired.

* * * * *